US008175404B2

United States Patent
Bichlmaier et al.

(10) Patent No.: US 8,175,404 B2
(45) Date of Patent: May 8, 2012

(54) METHOD AND DEVICE FOR ESTIMATING IMAGE QUALITY OF COMPRESSED IMAGES AND/OR VIDEO SEQUENCES

(75) Inventors: Thomas Bichlmaier, Munich (DE); Christian Zuehlcke, Jetzendorf (DE); Arnd Eden, Braunschweig (DE)

(73) Assignee: Rohde & Schwartz GmbH & Co. KG, Munich (DE)

( * ) Notice: Subject to any disclaimer, the term of this patent is extended or adjusted under 35 U.S.C. 154(b) by 1020 days.

(21) Appl. No.: 11/963,047

(22) Filed: Dec. 21, 2007

(65) Prior Publication Data

US 2008/0175503 A1 Jul. 24, 2008

(30) Foreign Application Priority Data

Dec. 21, 2006 (DE) .......................... 10 2006 060 762
Mar. 19, 2007 (EP) ..................................... 07005589
Apr. 18, 2007 (EP) ..................................... 07007926

(51) Int. Cl.
*G06K 9/38* (2006.01)

(52) U.S. Cl. ........ 382/248; 382/233; 382/235; 382/232; 382/246; 382/250; 375/240.75; 375/E7.078; 375/E7.108; 375/E7.211; 375/240.15; 348/403; 348/413; 348/416; 348/419; 348/423

(58) Field of Classification Search .................. 382/248, 382/233, 235, 232, 246, 250; 375/224–228, 375/240.75, E7.078, E7.108, E7.211; 348/403, 348/413, 416, 419, 423

See application file for complete search history.

(56) References Cited

U.S. PATENT DOCUMENTS 6,011,868 A * 1/2000 van den Branden et al. . 382/233
6,535,647 B1 * 3/2003 Abousleman .................. 382/253
6,668,088 B1 * 12/2003 Werner et al. .................. 382/239

(Continued)

FOREIGN PATENT DOCUMENTS

EP      0 869684 A2     10/1998

(Continued)

OTHER PUBLICATIONS

Ichigaya et al. "A Method of Estimating Coding PSNR Using Quantized DCT Coefficients", IEEE Transactions on Circuits and Systems for Video Technology, vol. 16, No. 2, Feb. 2006, 251-259.*

(Continued)

*Primary Examiner* — Brian Q Le
*Assistant Examiner* — Mekonen Bekele
(74) *Attorney, Agent, or Firm* — Ditthavong Mori & Steiner, P.C.

(57) ABSTRACT

A method for estimating quality of images compressed with a transformation based compression method. The estimation method uses estimated errors generated by quantization to obtain an image quality indicator and does not require use of a reference image. The estimation method includes calculating a probability of at least one specific quantized transformation coefficient value for at least all coefficients representing one identical two-dimensional frequency, and estimating identifying parameters of at least one probability density function of non-quantized coefficient values from the quantized coefficient value probabilities, with a type of probability density function being preset. The estimation method further includes calculating an image quality indicator from errors introduced by quantization, which are derived from probability density function parameters and quantization parameters.

24 Claims, 7 Drawing Sheets

U.S. PATENT DOCUMENTS

| | | | | |
|---|---|---|---|---|
| 2002/0181598 A1* | 12/2002 | Vetro et al. | | 375/240.27 |
| 2005/0111742 A1* | 5/2005 | Seo | | 382/233 |
| 2005/0111747 A1* | 5/2005 | Bauschke et al. | | 382/251 |
| 2005/0207660 A1* | 9/2005 | Edgar | | 382/232 |
| 2006/0133479 A1* | 6/2006 | Chen et al. | | 375/240.03 |
| 2008/0317111 A1* | 12/2008 | Davis | | 375/227 |

FOREIGN PATENT DOCUMENTS

| | | | |
|---|---|---|---|
| EP | 869684 A2 * | 10/1998 | |
| WO | WO 2004/054274 A1 | 6/2004 | |

OTHER PUBLICATIONS

Ichigaya et al. "A Method of Estimating Coding PSNR Using Quantized DCT Coefficients", IEEE Transactions on Circuits and Systems for Video Technology, vol. 16, No. 2, Feb. 2006, 251-259.*

European Search Report, Jun. 27, 2007.

Atsuro Ichigaya et al., A Method of Estimation Coding PSNR Using Quantized DCT Coefficients. IEEE Transactions on Circuits and Systems for Video Technology, Feb. 2, 2006, vol. 16, IEEE.

* cited by examiner

METHOD AND DEVICE FOR ESTIMATING IMAGE QUALITY OF COMPRESSED IMAGES AND/OR VIDEO SEQUENCES

CROSS-REFERENCE TO RELATED APPLICATIONS

The present application claims priority to German Patent Application No. DE 10 2006 060 762.7 filed on Dec. 21, 2006, to European Patent Application No. 07 005 589.2 filed on Mar. 19, 2007, and to European Patent Application No. 07 007 926.4 filed on Apr. 18, 2007, the entire contents of which are herein incorporated by reference.

BACKGROUND OF THE INVENTION

1. Field of the Invention

The invention relates to estimating the quality of images, and more particularly to estimating the quality of images of image sequences, especially video sequences, that have been compressed digitally with a loss of information.

2. Discussion of the Background

During the last years various approaches have been developed to measure the quality of compressed pictures and video sequences. The outcome of this research was a variety of different algorithms, some of which are capable of determining a quality value with a high correlation compared to the perceived quality. This could be shown by comparisons to the results of subjective tests. Basically, those algorithms can be divided into three groups.

A first group compares a distorted video signal to an undistorted reference signal. From the two signals the perceived difference is calculated using a model of the human visual system. This type of model determines a "quality map" on a per pixel basis or to accumulate the error to achieve one quality value for a whole picture. The peak signal to noise ratio is one example of such an algorithm, applying a very simple model of the human visual system. Other popular algorithms are the so-called Sarnoff Model, which calculates an error signal in units of "just noticeable differences" (JND), and the Structural Similarity Analysis. Algorithms that use the undistorted signal as a reference are referred to as full-reference algorithms. However, they are applicable only to a few scenarios because in most applications there is no undistorted (uncompressed) reference signal available.

In order to reduce the amount of data needed for the calculation some algorithms extract features from the reference signal and the distorted signal. Thus, for a measurement of the picture quality only these features have to be considered instead of the whole reference sequence. These so-called reduced-reference algorithms can be used to evaluate picture quality at the receiver side of a transmission. However, their use requires an implementation of parts of the algorithm at the signal source and the transmission of side information in the data stream. Although it is technically feasible to implement such a system, it is desirable to determine the picture quality without having to extract information at the signal source.

A third group of algorithms tries to determine the picture quality only from the distorted picture and from side information present in the data stream. Most of these so-called no-reference algorithms are based on a detection of well-known coding artifacts. The blocking artifacts which are introduced by transform coders are used as a quality indicator. These artifacts appear periodically in the image and thus are detectable, e.g. via a statistical analysis of an edge image at block boundaries. The majority of all no-reference algorithms is based on the detection of blocking artifacts. Blocking indicators for example work well for MPEG-2 coded sequences. When encoding H.264-coded sequences the blocking artifacts are reduced by a deblocking filter which is part of the standard. Therefore, a detection of blocking artifacts does not lead to feasible results.

Another approach is the estimation of the coding error from the coded video sequence. In A. Ichigaya, M. Kurozumi, N. Hara, Y. Nishida, E. Nakasu, "A method of estimating coding PSNR using quantized DCT coefficients", IEEE Trans. Circuits and Systems for Video Technology, Vol. 16, No. 2, pp. 251-259, February 2006, an algorithm for the estimation of the coding peak signal to noise ratio of MPEG-2 coded sequences is introduced where error variance is calculated from transform coefficients. For this calculation the distribution of the transform coefficients is estimated. Based on these distributions the error variance is calculated. However, this approach is limited to a DCT (discreet cosine transform) as transformation function. The accuracy of the quality estimates needs improvement.

SUMMARY OF THE INVENTION

Accordingly, an embodiment of the present invention advantageously provides a method and a device for efficiently estimating the quality of images and image sequences for a wide variety of transformation based lossy compression algorithms, such as the H.264 algorithm, without the need for using reference data.

An embodiment of the invention obtains an image quality indicator by estimating the quantization errors which occur during transformation based compression of the images. The probability of a certain value of an identical transformation coefficient in all transformation blocks of the image is calculated by counting the number of coefficients quantized to a specific value and dividing by the number of relevant coefficients. From these probabilities of the quantized coefficients a probability density function of the non quantized coefficients is estimated by preselecting a function type and calculating the identifying parameters from the probabilities generated in the previous step. In a last step the quantization errors are calculated from the obtained probability density function and the quantization stepsize known from the parameters used for quantization.

The result is an image quality indicator that does not require the use of reference data. An application at the receiving side of a broadcast is therefore possible. Furthermore the invention is compatible with a wide variety of transformation based image compression methods, since a reliance on blocking artifacts is not given and any transformation functions are supported. By supporting any probability density function for the coefficient distribution a great flexibility concerning image content is possible.

The optional setting using a Laplace distribution as probability density function takes the properties of most real-world images into account, favorably using mean square errors to process the quantization errors results in a relatively low computational complexity. By favorably using peak signal to noise ratio as image quality indicator a good match of the image quality indicator to the actual perceived quality is achieved. By only accepting orthogonal functions as transformation functions in the compression methods supported the validity of the assumption that the errors in the frequency domain correspond to the errors in the spatial domain is assured and additional errors on the account of a non orthogonal transformation function are prevented.

By favorably allowing transformation functions resulting in non normalized transformation coefficients, a greater flexibility of the compatible image compression methods is achieved. For example, the widely used H.264 algorithm uses such a transformation function. The option of using only probability density functions which are identified by a single probability value reduces the computational complexity of the image quality estimation because only the coefficients concerning one two-dimensional frequency have to be analyzed. Optionally several coefficient values can be used to obtain an even more precise estimate of the probability density function although in principle only one value is necessary.

By performing several cycles different transformation block sizes within one image can be analyzed. A varying quantization parameter within one image can be processed in an analogue fashion. The flexibility of supported image compression methods is thereby greatly increased.

An optional entropy decoding step preceding the image quality estimation further increases the flexibility of supported image compression methods further while preventing the need for completely decoding the images and thereby reduces computational complexity. By performing a cycle for each image of an image sequence the flexibility is further increased to accommodate image sequences. The optional "full mode" for image sequences estimates the quality for each image without computational complexity in consideration. The optional "fast mode" for image sequences estimates the quality for only a subset of images with computational complexity in consideration. In this mode the quality estimation is processed at the same speed as the image sequence progresses. Therefore in a real time application a quality estimate is always available. To achieve this real time behavior images are skipped as necessary.

BRIEF DESCRIPTION OF THE DRAWINGS

An exemplary embodiment of the invention is now further explained with respect to the drawings, in which.

DETAILED DESCRIPTION OF EMBODIMENTS OF THE INVENTION

Figure 1:
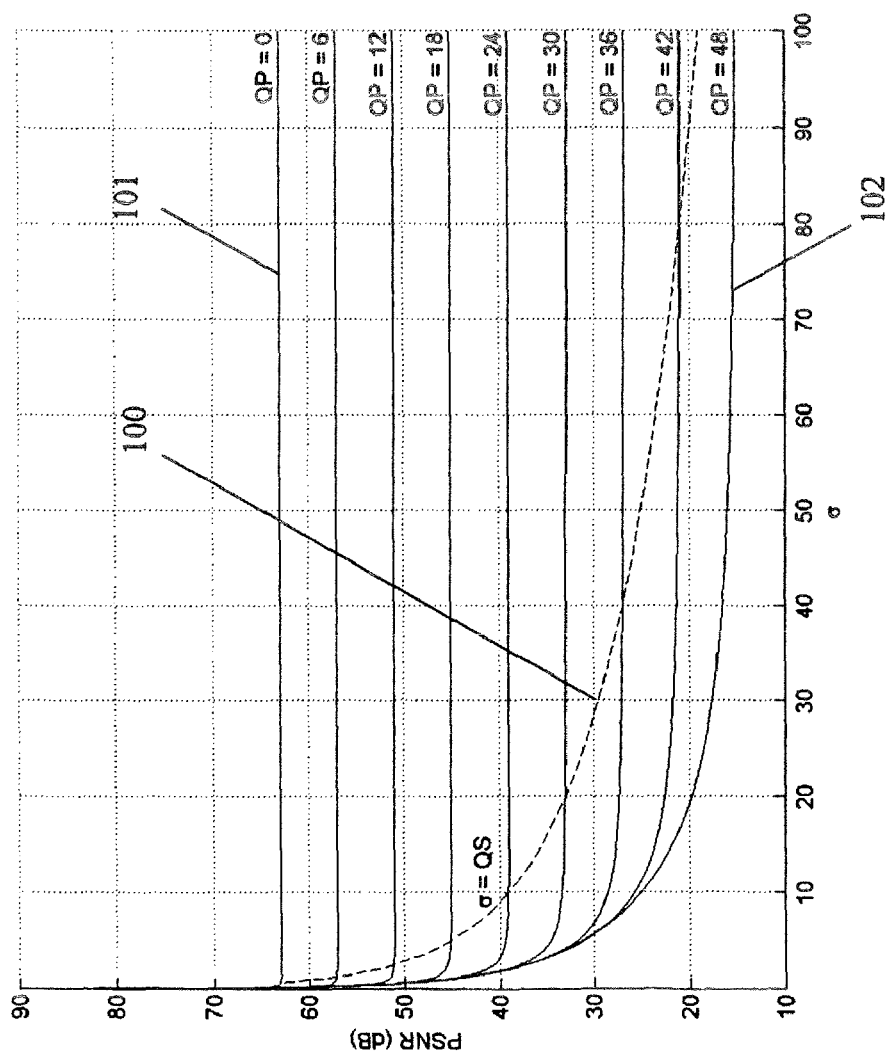
FIG. 1 shows the dependency of a peak signal to noise ratio of σ and a quantization parameter for one Laplacian distributed coefficient.

First, we demonstrate the mathematics and the general concept underlying the exemplary embodiment with respect to FIGS. 1-4b. In a second step, the function of an exemplary inventive device is shown with respect to FIGS. 5 and 6. The benefits and restrictions of the invention are finally shown with respect to FIGS. 7 and 8.

Similar entities and reference numbers in different figures have been partially omitted.

In the following the applicability of the peak signal to noise ratio as a quality indicator is shown. The peak signal to noise ratio is the most frequently used indicator for picture quality. It can be calculated from the intensity values of an undistorted reference signal p(x, y) and the distorted signal $\hat{p}(x, y)$ as follows.

$$PSNR = 10 \cdot \log_{10}\left(\frac{(2^Q - 1)^2}{MSE}\right) \quad (1)$$

$$MSE = \sum_{x=0}^{X-1} \sum_{y=0}^{Y-1} (\hat{p}(x, y) - p(x, y))^2 \quad (2)$$

MSE is the mean squared error and Q is the bit depth of an intensity value. The peak signal to noise ratio calculates the signal to noise ratio, where the coding error variance is interpreted as the noise power and a peak value is assumed for the power of the signal. Typically, only the luminance component is considered for quality evaluation. This work follows the same approach.

Compared to algorithms like the "Sarnoff Model" or the Structural Similarity Analysis, the peak signal to noise ratio can be interpreted as a very simple model of the human visual system (HVS). It assumes that the HVS is sensitive to squared differences between the reference signal and the distorted signal. This assumption is a coarse simplification of the real HVS. E.g. it does not consider spatial and temporal masking effects that occur at structured parts of the picture and fast motions, respectively. These effects can reduce the visibility of artifacts.

Nevertheless, it has been proven that the peak signal to noise ratio is a good estimation of the perceived quality. Correlations with the results of subjective tests are about 80%. This is comparable to the performance of blocking indicators and even of some more complex algorithms. Therefore, the peak signal to noise ratio may be used as an indicator for picture quality.

One of the innovations in H.264 is the kind of transformation. Instead of the classical discrete cosine transformation (DCT), which is used in practically all transform coders, an approximated DCT is used. This transformation can be computed completely in integer arithmetic. To achieve that advantage, the basis functions of the H.264 transformation are not normalized.

In the original profiles H.264 uses a block size of 4 by 4 for the transformation. With the so-called fidelity range extensions, the high profile was introduced which also supports 8 by 8 blocks. When this feature is used the block size can be chosen adaptively for each macroblock.

The quantization of the transform coefficients is controlled via a quantization parameter (QP) which can be adapted for each macroblock. QP steers the quantization step size exponentially. The step size QS is given as follows.

$$QS = c \cdot 2^{\frac{QP}{6}} \quad (3)$$

Therefore, QP can be interpreted as the quantization step size in dB. Concerning the quantization of the normalized coefficients, the constant c is the same for all coefficients. The high profile allows an additional quantization matrix, which can be chosen arbitrarily. Then the factor c is different for each coefficient. However, the principal calculation of the quantization step size stays the same.

In the following, one transform block size is assumed that does not change for the whole picture. If the adaptive transform block size is used, the principal calculations stay the same. However, the computation of the error variance has to be made twice, where each time only the macroblocks with one specific block size are considered. Then the two error variances are combined to one overall value from which the peak signal to noise ratio is determined.

Calculation of the Coding Error in the Transform Domain is now described. For the calculation of the peak signal to noise ratio, the power of the coding error has to be determined, which is equivalent to the mean squared error. As the transformation, which is used for the transform coding in H.264, is an orthogonal transformation, the power can be calculated in the spatial domain as well as in the transform domain. This property is due to Parseval's theorem. However, the basis functions of the transformation are not normalized. Therefore, the contribution of each coefficient has to be scaled by a correction factor. The calculation of the power for one transform block can be written as follows.

$$P = \frac{1}{N^2} \sum_{i=1}^{N} \sum_{j=1}^{N} \frac{F^2(i,j)}{a_{ij}^2} \quad (4)$$

F is one block of transform coefficients for one block of the picture. N is the block size that can be 4 or 8 in H.264 coded pictures. $a_{ij}$ is a normalization constant for the coefficient at position (i, j) inside the block. If the concrete coefficients are unknown, but if for each of the 4 by 4 or 8 by 8 coefficients a probability density function is given, the power can be calculated as the sum of the second order moments of each probability density function $p_{i,j}(\lambda)$ as follows.

$$P = \frac{1}{N^2} \sum_{i=1}^{N} \sum_{j=1}^{N} \int_{-\infty}^{\infty} \left(\frac{\lambda}{a_{ij}}\right)^2 p_{i,j}(\lambda) d\lambda \quad (5)$$

$\lambda$ stands for the coefficient value. In the transform domain the coding error occurs as a quantization error. In general, the quantization error of a coefficient from the k-th quantization interval is $$\lambda - q_k, \quad (6)$$

where $q_k$ is the k-th representation value of the quantization. For the calculation of the power of the quantization error the integral has to be solved piecewise for each quantization interval $[a_k, b_k]$.

$$P = \frac{1}{N^2} \sum_{i=1}^{N} \sum_{j=1}^{N} \sum_{k=0}^{\infty} \int_{a_k}^{b_k} \left(\frac{\lambda - q_k}{a_{ij}}\right)^2 p_{i,j}(\lambda) d\lambda + \quad (7)$$

$$\frac{1}{N^2} \sum_{i=1}^{N} \sum_{j=1}^{N} \sum_{k=-\infty}^{0} \int_{b_k}^{a_k} \left(\frac{\lambda - q_k}{a_{ij}}\right)^2 p_{i,j}(\lambda) d\lambda$$

$a_k$ and $b_k$ are parameters that principally can be chosen by the encoder. The most common choice is to set $a_0 = 0$ $a_k = \text{sign}(k) \cdot (|k| - 1 + \alpha) \cdot QS$ for $|k| = 1 \ldots \infty$ $b_k = \text{sign}(k) \cdot (|k| + \alpha) \cdot QS$ for $|k| = 0 \ldots \infty$ \quad (8)

$q_k = k \cdot QS$ for $|k| = 0 \ldots \infty$

QS is the quantization step size. If $\alpha = 0.5$ the quantization is performed by a simple rounding operation. If the probability density function is symmetrical, the sum in equation (7) may be evaluated only for positive values of k and then multiplied by two. If adaptive quantization is used, P has to be computed for each quantization parameter (QP) and combined to one value, considering the frequentness of macroblocks with each QP.

In the following a closed form expression for the computation of the mean squared error for one transform coefficient shall be derived. Therefore, it is assumed that the coefficient value is Laplacian distributed and the quantization follows (8a). Then the mean squared quantization error MSE is given by $$MSE = \sum_{k=0}^{\infty} \int_{a_k}^{b_k} (x - q_k)^2 \cdot \frac{1}{\sigma} e^{-\frac{\lambda}{\sigma}} d\lambda \quad (8a)$$

$$= \sum_{k=0}^{\infty} \left[ -e^{-\frac{\lambda}{\sigma}} ((\lambda - q_k)^2 + 2\sigma(\lambda - q_k) + 2\sigma^2) \right]_{a_k}^{b_k}$$

With the quantization thresholds from (8a) the formula can be brought to the following form:

$$MSE = e^{-0}(2\sigma^2) - \sum_{i=0}^{\infty} e^{-\frac{(i+\alpha)QS}{\sigma}} \cdot (((i+\alpha)QS - iQS)^2 +$$

$$2\sigma((i+\alpha)QS - iQS) + 2\sigma^2) - (((i+\alpha)QS - (i+1)QS)^2 +$$

$$2\sigma((i+\alpha)QS - (i+1)QS) + 2\sigma^2)$$

$$= 2\sigma^2 - e^{-\frac{\alpha QS}{\sigma}} \sum_{i=0}^{\infty} e^{-\frac{iQS}{\sigma}} ((\alpha QS)^2 + 2\alpha QS + 2\sigma^2) - ((\alpha - 1)^2 QS^2 +$$

$$2\sigma QS - 2\sigma\alpha QS + 2\sigma^2)$$

$$= 2\sigma^2 - e^{-\frac{\alpha QS}{\sigma}} ((2\alpha - 1)QS^2 + 2\sigma QS) \sum_{i=0}^{\infty} e^{-\frac{iQS}{\sigma}}$$

The remaining sum is an arithmetic progression. Thus, the expression can be simplified to $$MSE = 2\sigma^2 - ((2\alpha - 1)QS^2 + 2\sigma QS) \cdot \frac{e^{-\frac{\alpha QS}{\sigma}}}{1 - e^{-\frac{QS}{\sigma}}} \quad (8b)$$

With equation (1) the peak signal to noise ratio can be calculated from that expression, and with equation (3) the quantization step size QS can be substituted by the quantization parameter QP. This leads to FIG. 1.

If $\sigma$ grows towards infinity, mean squared error converges (without proof) towards $$MSE_{inf} = \frac{QS^2}{3}(\alpha^3 + (1 - \alpha)^3)$$

FIG. 1 shows the peak signal to noise ratio as a function of the standard deviation σ of the transform coefficient for the special case of α=0.5. In the different curves 101, 102 the quantization parameter QP is varied. It can be seen that the peak signal to noise ratio saturates for high values of σ. The saturation values depend linearly on QP. This is due to the logarithmic properties of QP. These saturation values correspond to the quantization noise power for uniformly distributed coefficients and provide a worst case estimator of the peak signal to noise ratio.

Realistic values of σ are near or below the quantization step size QS. Thus, the part of FIG. 1 to the left of the dashed line 100 is the most important one. In this area the peak signal to noise ratio depends significantly on σ. Therefore, the estimation can be optimized compared to the worst case estimation by applying an estimation of σ. The curves also give information about the accuracy of the estimation. At small values of σ and large values of QP 102, respectively, the slopes of the curves are higher. Therefore, small errors in the estimation of σ lead to comparatively high errors in the peak signal to noise ratio estimation, while for large values of σ and small values of QP 101 the estimation is very robust. Furthermore, underestimating σ has a worse effect than overestimating it.

An estimation of the transform coefficient distribution is derived in the following. It is shown how the peak signal to noise ratio can be calculated in the transform domain, if the probability density function of the transform coefficients are known. A very simple estimation of the peak signal to noise ratio could be determined assuming a uniform distribution of the coefficients. In this case the peak signal to noise ratio of each coefficient would be set to the respective saturation value in FIG. 1. For a more sophisticated estimation, some assumptions on the probability density function of the coefficients have to be made. A popular assumption is that the coefficients of the DCT are Laplacian distributed. Some works also assume generalized Gaussian or Cauchy distributions. The same assumptions can be made for the H.264 transform coefficients.

Figure 2:
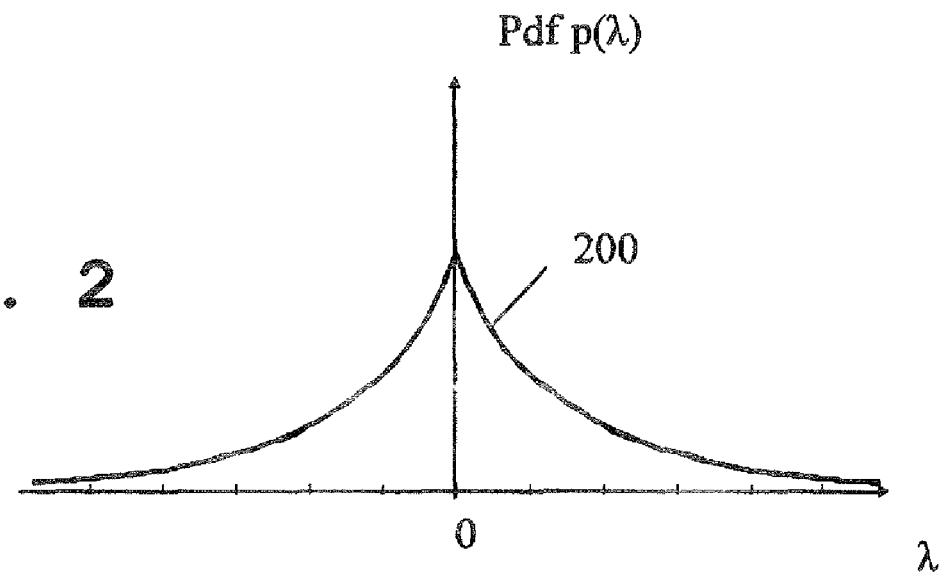
FIG. 2 shows the Laplacian distribution of image transformation coefficients.

In the following, a Laplacian distribution is assumed. This is illustrated in FIG. 2. Curve 200 shows a Laplacian distribution, where λ is the value of the coefficients and p(λ) is the probability density function. This distribution seems to be a good estimate for the real distribution of H.264 transform coefficients and is also good to be handled mathematically. Its probability density function is $$p(\lambda) = \frac{1}{2\sigma} e^{-\frac{|\lambda|}{|\sigma|}} \quad (9)$$

A straight forward approach to estimate the probability density function can be derived from the number of transform coefficients that are quantized to zero. These can be easily determined from the coded coefficients. The percentage of zero values for each transform coefficient can be interpreted as the probability that the respective coefficient is quantized to zero. The same probability can be derived from the probability density function by integrating over the first quantization interval.

Figure 3:
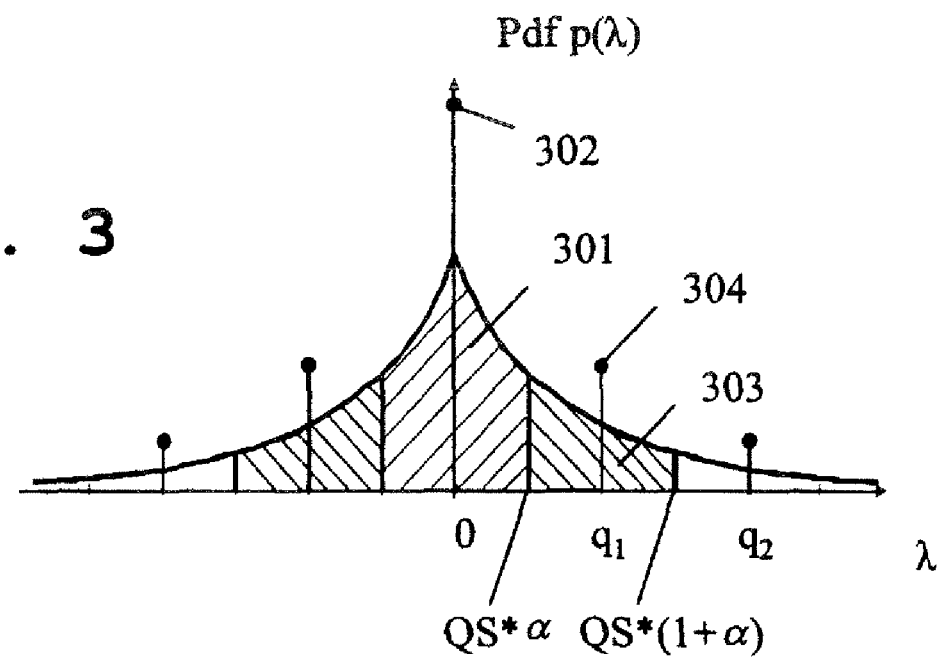
FIG. 3 shows the number of transformation coefficients quantized into the single quantization steps.

FIG. 3 shows the number of transformation coefficients quantized into the single quantization steps. The steps q1, q2, etc. are calculated by multiplying the quantization step size QS by the number of the step. The thresholds are calculated by multiplying the quantization step size QS by a plus the number of the step. The number of coefficients quantized into one step is shown in a normalized manner. The number of coefficients quantized into one step is divided by the total number of transformation coefficients. Therefore, reference number 302 indicates the probability of a coefficient to be quantized to 0. Reference number 304 indicates the probability of a coefficient being quantized 1, etc. For the Laplacian distribution the parameter σ can be calculated analytically for this approach as follows.

$$\frac{N_z}{N_{total}} = \int_0^{\alpha \cdot QS} \frac{1}{\sigma} e^{-\frac{\lambda}{\sigma}} d\lambda \quad (10)$$

$$\Rightarrow \sigma = -\frac{\alpha \cdot QS}{\ln\left(1 - \frac{N_z}{N_{total}}\right)}$$

$N_z$ is the number of zero values and $N_{total}$ is the overall number of values for one coefficient. Thus, an estimation of the probability density function for each coefficient can be calculated.

Figure 4A:
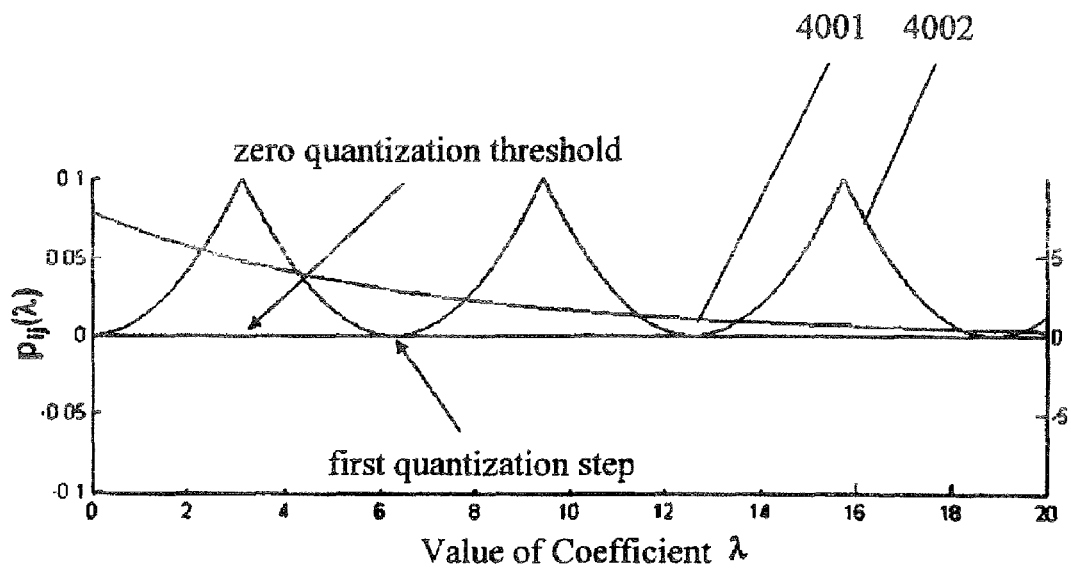
FIG. 4a shows an exemplary probability density function and an exemplary squared quantization error.
Figure 4B:
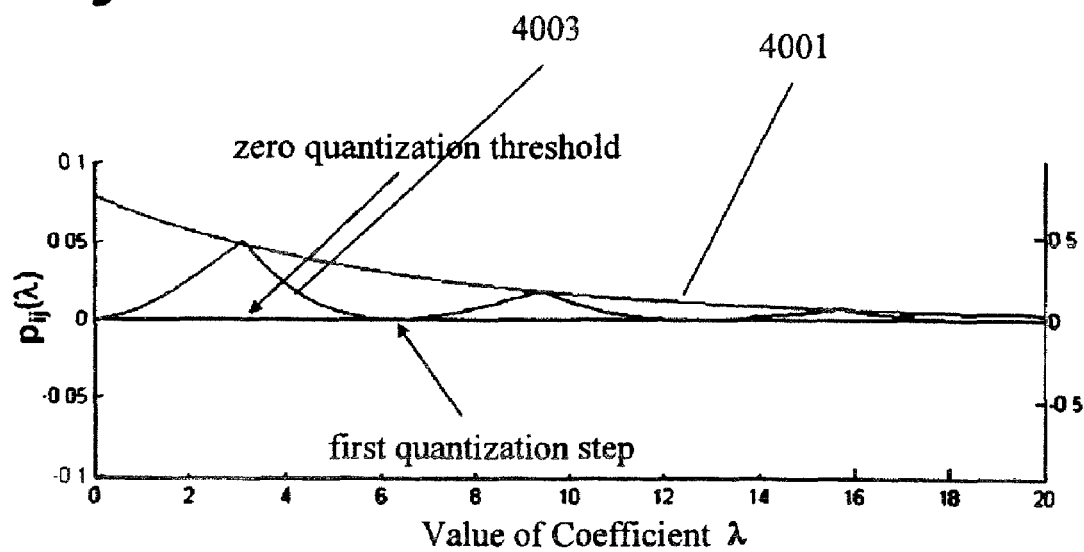
FIG. 4b shows a method for calculating the mean squared quantization error.

In FIG. 4a and FIG. 4b, the mean squared quantization error calculated from the distribution function is shown. The probability density function 4001 is depicted. The squared quantization error 4002 is zero at the quantization steps and maximal at the quantization thresholds. By weighting the squared quantization error 4002 with the probability density function 4001, the weighted squared quantization error 4003 is obtained. By integrating the weighted squared quantization error 4003, the mean squared error is obtained.

Figure 5:
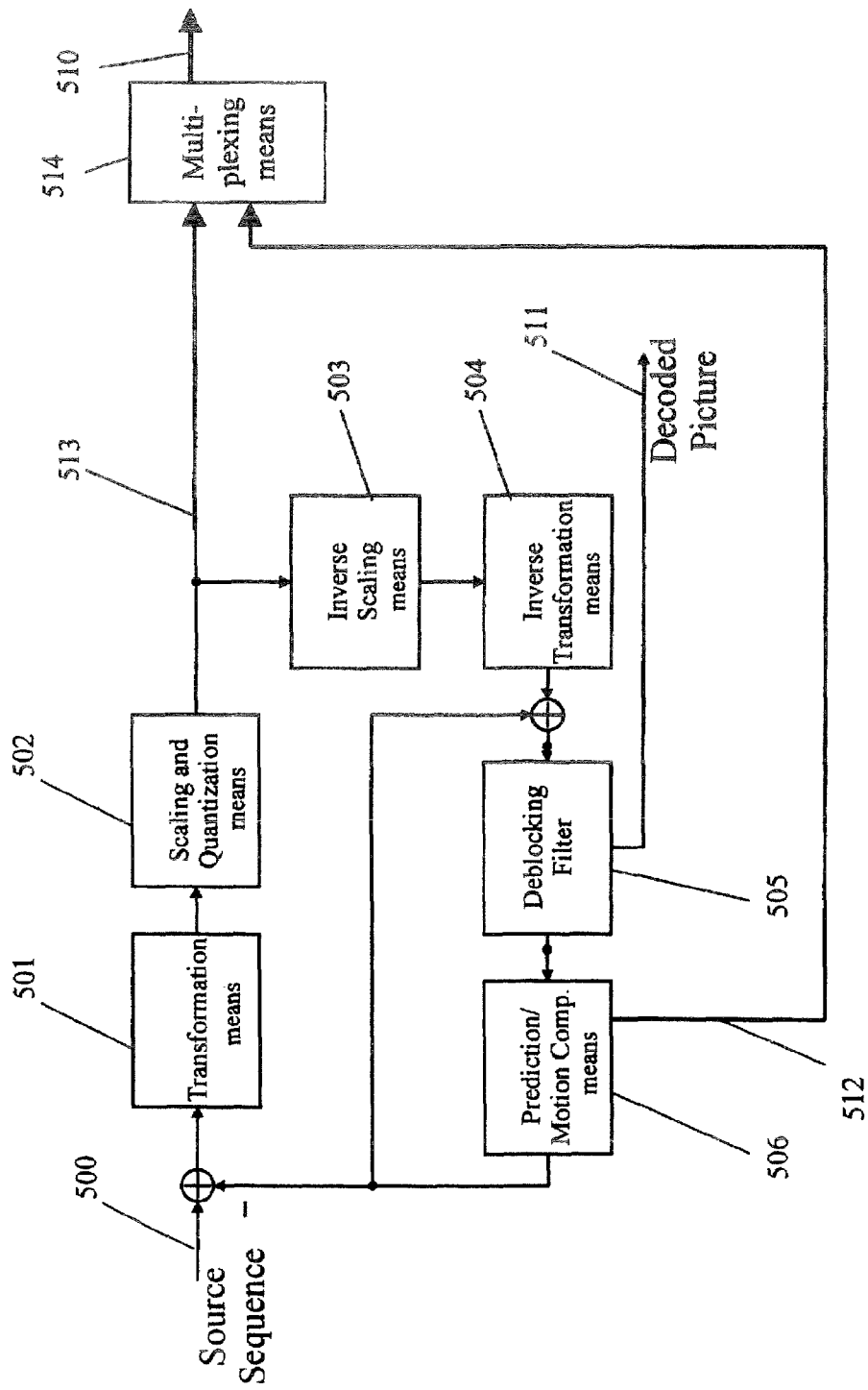
FIG. 5 shows the main functions of a H.264 encoder and decoder in a block diagram

FIG. 5 shows the main functions of a H.264 encoder and decoder in a block diagram. A source sequence 500 is comprised of pixel information. The pixel information is transformed in transformation means 501 by a modified discreet cosine transformation (DCT). The resulting data is represented in the frequency domain. The transformation coefficients are scaled and quantized in scaling and quantization means 502. The resulting data 513 is combined with additional data 512 from a Prediction/Motion Compensation means 506 within a Multiplexing means 514. The encoded datastream 510 is decoded by inverse scaling means 503 and following inverse transformation means 504. To reduce blocking artifacts, a deblocking filter 505 follows. The resulting data is the decoded picture 511. For encoding, the decoded picture is processed by prediction/motion compensation means 506 and passed on to be partially subtracted from the source sequence 500 before entering the transformation means 501.

The influence of the deblocking filter 505 is shown in the following. As mentioned in the introduction, H.264 uses an adaptive filter to suppress blocking artifacts. This filter increases the perceived quality of the videos. As it is located inside the decoding loop in the decoder as well as in the encoder, the filtered pictures are used for motion compensation 506. Therefore, the positive effects on the picture quality can be used for the prediction of subsequent pictures. As the deblocking filter 505 is located behind the inverse transformation, its effects on the current picture are not considered by a method that uses only the coded transform coefficients for quality evaluation. This effect is ignored. This is tolerable because the effects of the deblocking filter on the peak signal to noise ratio are marginal.

Figure 6:
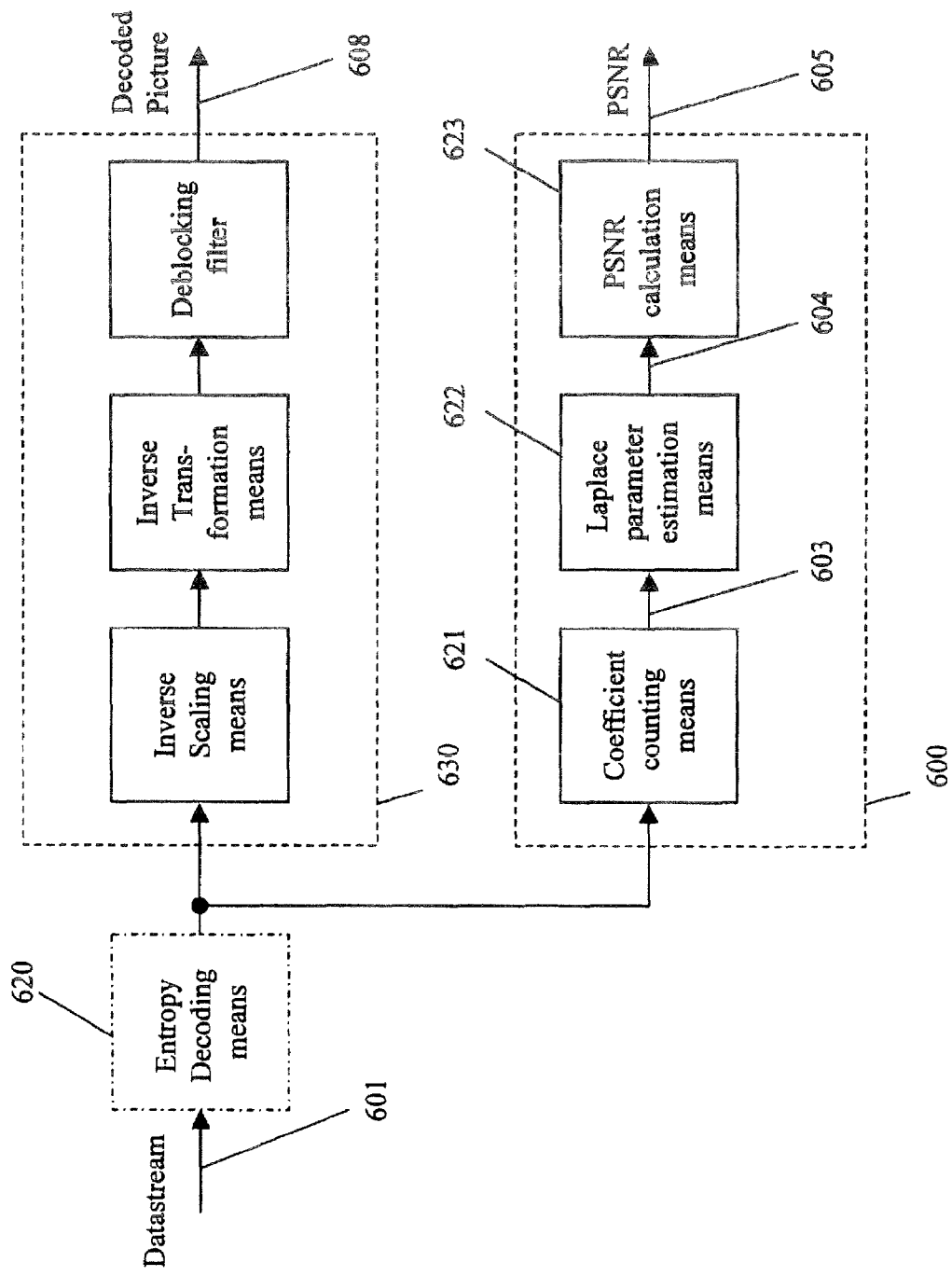
FIG. 6 shows the function an exemplary embodiment of the inventive device in a block diagram.

FIG. 6 shows the function an exemplary embodiment of the innovative device in a block diagram. The optional entropy decoding means 620 removes a potential entropy coding from the source Datastream 601. The resulting data corresponds to the Datastream 513 from FIG. 5. It is the input for the decoding means 630 as well as the quality estimation means 600.

The decoding process has been described with respect to FIG. 5 and therefore will be omitted here. The quality estimation facility 600 comprises a coefficient counting means 621, a Laplace parameter estimation means 622 and a peak signal to noise ratio calculation means 623. The input data is first processed by the coefficient counting means 621.

The quantized transformation coefficients of each transformation block of the image are analyzed. The coefficient values for the different coefficients are summed and divided by the number of according coefficients. The resulting data is the likelihood of a coefficient being quantized to a certain value. Preferably only the likelihood of the coefficients being quantized to the value of 0 is processed to reduce computational complexity.

These coefficient likelihoods 603 are passed on to the Laplace parameter estimation means 622. The Laplace parameter estimation facility 622 estimates the parameters of the Laplacian distribution of the coefficient values and thereby completely specifies the Laplacian distribution. The Laplacian parameters 604 are forwarded to the peak signal to noise ratio calculation means 623. The quantization parameter QP and the Laplacian parameters 604 suffice to calculate the mean squared error of the quantized coefficient values. In case of using more than one coefficient value (e.g. other than 0), the average mean squared error is calculated. Alternatively, in case of using more than one coefficient value, the coefficients can be used to obtain a single more precise probability density function estimate. In that case only one mean squared error is calculated. The peak signal to noise ratio is calculated from the mean squared error. The output signal 605 is the peak signal to noise ratio for the entire image. It closely resembles the perceived quality of the image.

The limitations of the embodiment are presented in the following. So far it has been argued that under certain assumptions a calculation of the peak signal to noise ratio from the H.264 datastream is possible. Nevertheless, there are situations where the assumptions do not hold.

The first assumption is that the coefficient values follow a Laplacian distribution. This assumption is not exactly fulfilled. However, in general the use of other distributions (e.g. a generalized Gaussian distribution) would require numerical calculations at different parts of the algorithm where the Laplacian distribution allows analytical calculations.

Figure 7:
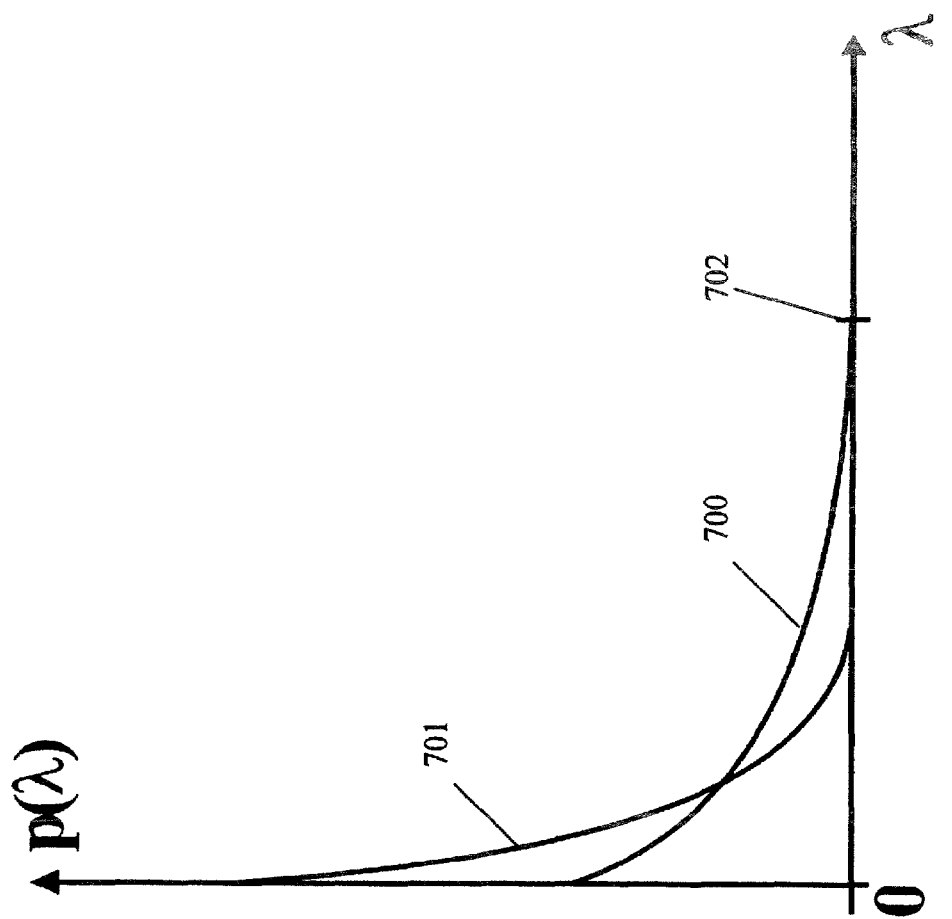
FIG. 7 shows different probability density functions.

Another assumption which is implicitly made for the derivation of 10 is, that $N_z$ is smaller than $N_{total}$. This means that the respective coefficient is not quantized to zero in all transform blocks of the picture. If $N_z$ is equal to $N_{total}$, then only an upper limit can be calculated for $\sigma$. This is illustrated in FIG. 7. A probability density function with steeper slope 701 covers the same area as a probability density function with a more shallow slope 700. The quantization threshold of the first quantization step is indicated by 702. The use of an upper limit for the further calculations leads to an overestimation of the coding error and thus to an underestimation of the peak signal to noise ratio. This effect occurs especially for coarse quantizations which is equivalent to low data rates in critical pictures.

The results of using the embodiment to measure quality of compressed images is shown in the following. For the evaluation a series of sequences was used. The sequences have been H.264 encoded using three different software encoders. For each of the coded sequences the peak signal to noise ratio was calculated using the uncompressed signal as a reference. The peak signal to noise ratio was estimated additionally using the proposed method and device.

Figure 8:
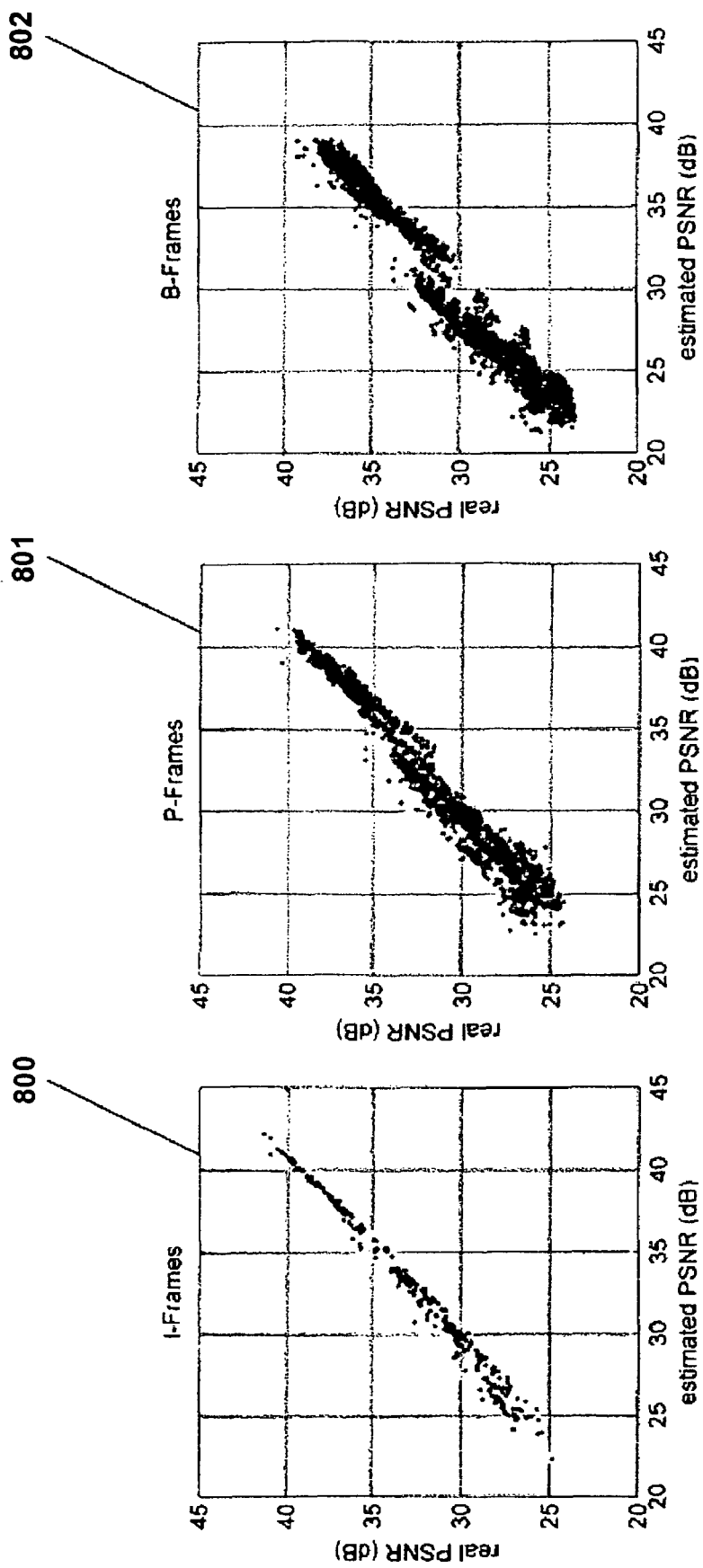
FIG. 8 shows a comparison of the real peak signal to noise ratio and the estimated peak signal to noise ratio using an exemplary embodiment of the invention to obtain the estimate.

As shown in FIG. 8, the correlation between the real peak signal to noise ratio and the estimated peak signal to noise ratio lies above 95% even for the B-pictures 802, where the estimation works comparatively badly. For I-pictures 800 the correlation lies above 99%. The mean error $\mu_e$ and the standard deviation $\sigma_e$ of the error allow for a more sophisticated analysis of the results. It can be seen that for I-pictures 800 a very high accuracy can be achieved. The standard deviation lies clearly below 1 dB.

For P-frames 801 and B-frames 802 the accuracy is lower but still good. This is probably due to the fact that I-pictures contain most of the information in their prediction error images while in P- and B-pictures the motion compensation gives already a good prediction of the picture. This leads to smaller values of $\sigma$ in P- and B-pictures which raises the influence of estimation errors due to the slope of the error function. For low peak signal to noise ratio values that correspond to coarse quantization the estimation is less accurate. This can be explained by the same effect. Additionally, for coarser quantization more transform coefficients are quantized to zero. This can also lead to an overestimation of the coding error. This effect can be observed in FIG. 8, especially for the I-pictures.

The estimation of the peak signal to noise ratio can be computed with fairly simple mathematical operations. The most complex part of the algorithm in terms of calculation time is the H.264 decoder which is required to derive the needed information from the data stream. That decoder does not have to perform the whole decoding process. Therefore, the complexity of the proposed algorithm is lower than that of a usual H.264 decoder. Thus, a real time implementation is realistic.

It is also shown that the accuracy of the estimation is good, especially for I-pictures and especially for high data rates.

The invention is not limited to the examples and especially not to the compression algorithm H.264, The invention discussed above can be applied to many lossy image and video compression algorithms. The characteristics of the exemplary embodiments can be used in any combination.

The invention claimed is:

1. A method for estimating quality of images compressed with a transformation based compression method embodied in a program on a non-transitory computer-readable medium and including:

transforming image data available in a two-dimensional discreet spatial domain into a two-dimensional discreet frequency domain by a transformation function resulting in at least one transformation block having at least one transformation coefficient, each transformation block of a same size including transformation coefficients representing same two-dimensional frequencies;

scaling of the resulting transformation coefficients; and quantizing the scaled transformation coefficients using quantization parameters to set a number and/or size of quantization steps, wherein said method for estimating the quality of images comprises:

calculating a probability of at least one specific quantized transformation coefficient value for at least all coefficients representing one identical two-dimensional frequency;

estimating identifying parameters of at least one probability density function of non-quantized coefficient values from the quantized coefficient value probabilities, with a type of probability density function being preset; and calculating the image quality indicator from errors introduced by quantization, which are derived from probability density function parameters and quantization parameters, wherein the image quality indicator is a peak signal to noise ratio of the image, and wherein the probability density function used for estimating the errors introduced by quantization is defined using only a single probability value.

2. The method according to claim 1, wherein the estimated errors are processed as mean square errors to calculate the image quality indicator.

3. The method according to claim 1, wherein the probability density function is a Laplacian distribution.

4. The method according to claim 1, wherein the transformation used in a compression algorithm is an orthogonal transformation.

5. The method according to claim 1, wherein the quantized transformation coefficients of a compressed image are normalized and/or a missing normalization is compensated by correction factors during transformation coefficient value probability calculation.

6. The method according to claim 1, wherein the following are performed once for each different transformation block size within one image:
calculating the probability of at least one specific quantized transformation coefficient value for at least all coefficients representing one identical two-dimensional frequency;
estimating identifying parameters of at least one probability density function of the non-quantized coefficient values from the quantized coefficient value probabilities, with the type of probability density function being preset; and
calculating an image quality indicator from the errors introduced by quantization, which are derived from the probability density function parameters and the quantization parameters,
wherein an average of an estimated mean squared error for the different transformation block sizes is calculated to estimate a total mean squared error, a total peak signal to noise ratio, and the image quality.

7. The method according to claim 1, wherein the following are performed once for each different quantization parameter value within one image:
calculating the probability of at least one specific quantized transformation coefficient value for at least all coefficients representing one identical two-dimensional frequency;
estimating the identifying parameters of at least one probability density function of the non-quantized coefficient values from the quantized coefficient value probabilities, with the type of probability density function being preset; and
calculating the image quality indicator from the errors introduced by quantization, which are derived from the probability density function parameters and the quantization parameters,
wherein an average of an estimated mean squared error for the different quantization parameter values is calculated to estimate a total mean squared error, a total peak signal to noise ratio, and the image quality.

8. The method according to claim 1,
wherein the following are performed once for an entire image:
calculating the probability of at least one specific quantized transformation coefficient value for at least all coefficients representing one identical two-dimensional frequency; and
estimating the identifying parameters of at least one probability density function of the non-quantized coefficient values from the quantized coefficient value probabilities, with the type of probability density function being preset,
wherein the following are performed once for each different quantization parameter value within one image:
calculating the image quality indicator from the errors introduced by quantization, which are derived from the probability density function parameters and the quantization parameters, and
wherein an average of an estimated mean squared error for the different quantization parameter values is calculated to estimate a total mean squared error, a total peak signal to noise ratio, and the image quality.

9. The method according to claim 1, wherein the image is entropy decoded if it is entropy coded before beginning the calculation of the probability of at least one specific quantized transformation coefficient value for at least all coefficients representing one identical two-dimensional frequency.

10. The method according to claim 1, wherein:
the quality of single images is estimated directly; and
the quality of image sequences is estimated by separating each sequence into single images and performing the method separately.

11. The method according to claim 10, wherein a low computational speed leading to a slower progress of the quality estimation than a progression of the image sequences is not compensated in a full mode.

12. The method according to claim 10, wherein a low computational speed leading to a slower progress of the quality estimation than a progression of the image sequences is compensated for by skipping images in a fast mode.

13. A device for estimating the quality of images compressed with a transformation based compression method, with the transformation based compression method being embodied in a non-transitory computer-readable medium and including:
transforming image data available in a two-dimensional discreet spatial domain into a two-dimensional discreet frequency domain by a transformation function resulting in at least one transformation block having at least one transformation coefficient, each transformation block of the same size includes transformation coefficients representing same two-dimensional frequencies;
scaling of the resulting transformation coefficients; and
quantizing the scaled transformation coefficients using quantization parameters to set a number and/or size of quantization steps,
wherein said device comprises:
transformation coefficient counting means that calculates a probability of at least one specific quantized transformation coefficient value for at least all coefficients representing one identical two-dimensional frequency;
probability density function parameter estimation means that estimates identifying parameters of at least one probability density function of non-quantized coefficient values from the quantized transformation coefficient value probabilities, with a type of probability density function being preset; and
image quality indicator calculation means that calculates an image quality indicator from errors introduced by quantization, which are derived from probability density function parameters and quantization parameters,
wherein the image quality indicator is a peak signal to noise ratio of the image, and
wherein the probability density function used for estimating the errors introduced by quantization is defined using only a single probability value.

14. The device according to claim 13, wherein the estimated errors are processed as mean square errors to calculate the image quality indicator.

15. The device according to claim 13, wherein the probability density function parameter estimation means uses a Laplacian distribution as the probability density function.

16. The device according to claim 13, wherein transformations used to compress the images used as input to the device are orthogonal transformations.

17. The device according to claim 13, wherein quantized transformation coefficients are normalized and/or a missing normalization is compensated for by correction factors in the transformation coefficient counting means.

18. The device according to claim 13, wherein:
an additional cycle of quality estimation is performed by the device for each different transformation block size within one image; and
an average of the estimated mean square error from each cycle is calculated to obtain a total peak signal to noise ratio and the image quality.

19. The device according to claim 13, wherein:
an additional cycle of quality estimation is performed by the device for each different quantization parameter value within one image; and
an average of an estimated mean square error from each cycle is calculated to obtain a total peak signal to noise ratio and the image quality.

20. The device according to claim 13, wherein an input image is processed by an entropy decoding means before being processed by the transformation coefficient counting means if the input image is entropy coded.

21. The device according to claim 13, wherein:
the quality of single images is estimated by the device in one cycle; and
the quality of image sequences is estimated by the device by performing several cycles.

22. The device according to claim 21, wherein a low computational speed leading to a slower progress of the quality estimation than a progression of the image sequences is not compensated in a full mode.

23. The device according to claim 21, wherein a low computational speed leading to a slower progress of the quality estimation than a progression of the image sequences is compensated by skipping images in a fast mode.

24. A computer-program-product comprising a non-transitory computer-readable medium having program code stored on said computer-readable medium configured to perform the method of claim 1 when the program code is executed on a computer.

* * * * *